United States Patent [19]

Aron et al.

[11] Patent Number: 5,753,812
[45] Date of Patent: May 19, 1998

[54] TRANSDUCER FOR SONIC LOGGING-WHILE-DRILLING

[75] Inventors: Jeffrey B. Aron, Houston; Shu-Kong Chang, Sugar Land; Donald A. Klasel, Rosenberg; Ting M. Lau, Sugar Land, all of Tex.

[73] Assignee: Schlumberger Technology Corporation, Sugar Land, Tex.

[21] Appl. No.: 569,027

[22] Filed: Dec. 7, 1995

[51] Int. Cl.$^6$ .................... E21B 47/00; G01V 1/40; G01V 1/00

[52] U.S. Cl. .................... 73/152.47; 73/152.03; 73/587; 73/632; 367/14; 367/28; 181/102; 181/106

[58] Field of Search .................... 73/152.47, 152.03, 73/587, 632, 597; 367/31, 14, 25, 28; 181/102, 106

[56] References Cited

U.S. PATENT DOCUMENTS

| | | | |
|---|---|---|---|
| 2,350,371 | 6/1944 | Smith | 181/0.5 |
| 2,596,023 | 5/1952 | Goble et al. | 181/0.5 |
| 2,596,024 | 5/1952 | Goble et al. | 181/0.5 |
| 2,757,358 | 7/1956 | Ely | 340/18 |
| 2,788,510 | 4/1957 | Howes | 340/17 |
| 3,054,471 | 9/1962 | Knudsen | 181/0.5 |
| 3,063,035 | 11/1962 | Vogel et al. | 340/17 |
| 3,093,810 | 6/1963 | Geyer et al. | 340/18 |
| 3,136,381 | 6/1964 | Anderson | 181/0.5 |
| 3,144,090 | 8/1964 | Mazzagatti et al | 181/0.5 |
| 3,161,256 | 12/1964 | Pardue | 181/0.5 |
| 3,190,388 | 6/1965 | Moser et al. | 181/0.5 |
| 3,191,141 | 6/1965 | Schuster | 340/17 |
| 3,191,142 | 6/1965 | Lebourg | 340/17 |
| 3,191,143 | 6/1965 | Pardue | 340/17 |
| 3,213,415 | 10/1965 | Moser et al. | 340/17 |
| 3,271,733 | 9/1966 | Cubberly, Jr. | 340/17 |
| 3,288,245 | 11/1966 | Anderson | 181/0.5 |
| 3,340,953 | 9/1967 | Zemanek, Jr. | 181/0.5 |

(List continued on next page.)

FOREIGN PATENT DOCUMENTS

| | | |
|---|---|---|
| 375549 | 5/1994 | European Pat. Off. . |
| 716013 | 2/1980 | U.S.S.R. . |
| 752296 | 7/1956 | United Kingdom . |

OTHER PUBLICATIONS

A. L. Kurkjian and S.K. Chang, "Acoustic Multipole Sources in Fluid-filled Boreholes," Geophysics, vol. 51, No.1, pp. 148–163, Jan. 1986.

Thomas G. Barnes et al., "Passbands for Acoustic Transmission in an Idealized Drill String," The Journal of the Acoustical Society of America, vol. 51, No. 5, (Part 2), pp. 1606–1608.

Arthur E. Lord, Jr. et al., "Attenuation of Elasic Waves in Pipelines as Applied to Acoustic Emission Leak Detection," Materials Evaluation, vol. 35, No. 11 (Nov. 1977), pp. 49–54.

Waters, K.R., Reflection Seismology, John Wiley & Sons, Inc., 1981, TN 269.W37, pp. 195–196.

Primary Examiner—Hezron E. Williams
Assistant Examiner—J. David Wiggins
Attorney, Agent, or Firm—David L. Moseley; Wayne I. Kanak; James L. Jackson

[57] ABSTRACT

An acoustic wave transducer useful in sonic logging while drilling a borehole through an adjacent earth formation includes an array of transducer elements mounted circumferentially around a drill collar. The elements are bonded in an elastomer ring that is received in an external groove in the collar and are protected by a shield having windows. The elements are electrically connected in parallel so that when excited by an electrical pulse, the elements generate a monopole acoustic wave that propagates out into the formation. When used as a receiver, the electrically connected array of elements detect averaged acoustic waves from the formation around the circumference of the drill collar and have minimum sensitivity to acoustic multipole waves traveling through the drill collar.

28 Claims, 4 Drawing Sheets

U.S. PATENT DOCUMENTS

| | | | |
|---|---|---|---|
| 3,364,463 | 1/1968 | Pardue | 340/17 |
| 3,381,267 | 4/1968 | Cubberly, Jr. et al. | 340/17 |
| 3,493,921 | 2/1970 | Johns | 340/17 |
| 3,504,757 | 4/1970 | Chapman, III | 181/0.5 |
| 3,608,373 | 9/1971 | Youmans | 73/152 |
| 3,811,529 | 5/1974 | Crawford | 181/0.5 ED |
| 3,982,606 | 9/1976 | Berry et al. | 181/102 |
| 3,997,867 | 12/1976 | Claycomb | 340/18 NC |
| 4,020,452 | 4/1977 | Trouiller et al. | 340/17 R |
| 4,149,409 | 4/1979 | Serata | 73/151 |
| 4,265,305 | 5/1981 | Stone et al. | 166/113 |
| 4,293,936 | 10/1981 | Cox et al. | 367/82 |
| 4,302,826 | 11/1981 | Kent et al. | 367/82 |
| 4,494,072 | 1/1985 | Jeter et al. | 324/347 |
| 4,541,081 | 9/1985 | Smith | 367/168 |
| 4,636,999 | 1/1987 | Lygas | 367/156 |
| 4,641,520 | 2/1987 | Mao | 73/151 |
| 4,649,526 | 3/1987 | Winbow et al. | 367/35 |
| 4,665,511 | 5/1987 | Rodney et al. | 367/35 |
| 4,682,308 | 7/1987 | Chung | 367/31 |
| 4,685,091 | 8/1987 | Chung et al. | 367/31 |
| 4,744,245 | 5/1988 | White | 73/151 |
| 4,752,895 | 6/1988 | Sarr | 364/550 |
| 4,752,918 | 6/1988 | Boucher et al. | 367/158 |
| 4,759,000 | 7/1988 | Reitz | 367/176 |
| 4,791,797 | 12/1988 | Paske et al. | 73/152 |
| 4,832,148 | 5/1989 | Becker et al. | 181/104 |
| 4,850,450 | 7/1989 | Hoyle et al. | 181/102 |
| 4,855,963 | 8/1989 | Winbow et al. | 367/31 |
| 4,870,627 | 9/1989 | Hsu et al. | 367/69 |
| 4,872,526 | 10/1989 | Wignall et al. | 181/102 |
| 4,888,740 | 12/1989 | Brie et al. | 367/30 |
| 4,894,895 | 1/1990 | Rokurohta et al. | 29/25.35 |
| 4,932,003 | 6/1990 | Winbow et al. | 367/75 |
| 4,964,085 | 10/1990 | Coope et al. | 367/35 |
| 4,969,129 | 11/1990 | Currie | 367/41 |
| 5,027,331 | 6/1991 | Winbow et al. | 367/75 |
| 5,043,952 | 8/1991 | Hoyle et al. | 367/159 |
| 5,109,698 | 5/1992 | Owen | 73/632 |
| 5,214,251 | 5/1993 | Orban et al. | 181/102 |
| 5,226,018 | 7/1993 | Chang et al. | 367/39 |
| 5,274,606 | 12/1993 | Drumheller et al. | 367/82 |
| 5,309,404 | 5/1994 | Kostek et al. | 367/31 |
| 5,387,767 | 2/1995 | Aron et al. | 367/25 |
| 5,460,047 | 10/1995 | Jacobson | 73/632 |
| 5,469,736 | 11/1995 | Moake | 73/151 |

TRANSDUCER FOR SONIC LOGGING-WHILE-DRILLING

FIELD OF THE INVENTION

This invention relates generally to sonic or acoustic logging of formations surrounding a borehole during the drilling thereof, and particularly to new and improved sonic logging methods and apparatus using transducers that preferentially excite and receive monopole acoustic waves traveling through the formations while suppressing multipole acoustic waves that travel through the drill collar on which the transducers are mounted.

BACKGROUND OF THE INVENTION

Sound waves propagate underground at velocities which vary in different geological formations. For example an acoustic wave travels at about 4000 meters per second in a sandstone, and about 5000 meters per second in a limestone. Sound waves in rock can be classified into two types: longitudinal and transverse. A longitudinal (compression) wave is one in which the medium vibrates forward and rearward, parallel to the direction of propagation. A transverse (shear) wave is one in which the vibration of the medium is perpendicular to the direction of motion of the wave energy. The speed or velocity of a sound wave through a medium is related to the porosity of the medium, an important characteristic of a formation insofar as its potential for containing hydrocarbons is concerned.

To measure the velocity of a sound wave, a logging tool typically has two receivers that are spaced along the tool axis at different distances from a transmitter of a sound signal, and the phase or travel time difference between waves arriving at the respective receivers can be used to determine sonic velocity. The use of two receivers eliminates travel time in the drilling mud and compensates for various tool and borehole effects.

That sound waves travel more slowly through a more porous rock is of importance because petroleum products of commercial interest usually are found in rocks with good porosity.

Anomalies in sound travel time in shales, which normally increases in a predictable manner with depth, can serve as a warning that the borehole is approaching a high pressure porous zone, and thereby signal the danger of a blowout. Although a number of other techniques using sound waves have been investigated, the principal use remains the measurement of sonic velocity which, in conjunction with the well known Wyllie formula, is used to compute the porosity of the rock.

Particularly in combination with neutron and density logs, the sonic log has become basic to seismic correlation and reservoir evaluation.

The foregoing sonic logging techniques have been used in the main in open hole logging where a sonde is suspended on electric wireline (drill string out of the hole). However, in recent years various tools and equipment have become available for making logging-type measurements while the drilling of the borehole is in progress. Examples of such tools for making, respectively, nuclear and resistivity measurements are described in U.S. Pat. Nos. 4,879,463 and 4,899,112. Measuring devices and systems are incorporated in special drill collars located near the bit, and the results of various measurements are telemetered uphole in the form of pressure pulses in the mud stream for detection, display and/or recording, substantially in real time. However, the fact that there is a massive metal collar in the borehole where the sonic measurements are to be made creates certain problems. A major problem is that some of the energy from the transmitter travels along the collar and reaches the receivers substantially simultaneously with the energy that traveled through the formation, thereby interfering with measurement of the energy from the formation. One solution to this problem that has been proposed is to cut annular grooves in the collar which attenuate wave propagation in a certain frequency band. Another approach has been to operate the transmitter in a frequency band to minimize collar arrivals. These approaches are described, for example, in European Patent No. 0 375 549 B1.

Another wave energy source that has been tried employs stacks of piezo-electric elements, mounted perpendicular to and symmetrically about the longitudinal axis of the drill collar, along with point receivers mounted on the collar. Such a transmitter is described in U.S. Pat. No. 5,387,767. These transmitters excite sound waves in both the collar and the formation, and the receivers detect both waves. Monopole and, unfortunately, quadrupole and higher order multipole waves are generated, and any asymmetries in collar geometry can convert the collar waves into multipole modes. The point receivers are sensitive to all these waves indiscriminately, and attenuation of multipole waves by means of a grooved collar section is quite difficult because each multipole wave has a different wave propagation characteristic.

The perpendicularly mounted piezo-electric stack transmitter has a strong quadrupole output because it generates two separated but in-phase and nearly identical pressure pulses which propagate from ports on the collar. These waves interfere to produce a strong quadrupole mode that travels a bit slower but with a greater amplitude than the monopole collar arrival. This arrival can interfere and be confused with the true monopole formation compressional sound wave and thereby give misleading results. In an effort to overcome this problem, the transmitter stack has been oriented at 45° to the receiver where the amplitude of the quadrupole wave should be a minimum. However, such minimum is over a narrow angle, and the quadrupole wave energy may rotate somewhat. In one aspect, the present invention simplifies the approach to the collar wave problem by using transducers that enhance the monopole acoustic waves while suppressing the multipole waves, which are difficult to attenuate by means of grooves in the collar.

Although numerous proposals for sonic transducers have been made in the past in connection with electric logging tools and techniques, very few have any potential use in logging-while-drilling operations. One device employed a piezo-electric cylinder which cannot be easily placed on a drill collar. Variations of this transducer have been proposed to generate multipole waves, and for that reason are not particularly useful because such waves should be eliminated. A few other transducers, such as ferromagnetic devices, have also been proposed but have never been tried on a drill collar. In another aspect the present invention employs a transducer that is mounted on the outer periphery of the drill collar to maximize the excitation of formation sound waves while minimizing multipole waves in the drill collar.

The general object of the present invention is to provide new and improved methods and apparatus for sonic logging-while-drilling by using transducers which enhance monopole acoustic wave excitation while minimizing multipole acoustic drill collar waves so that detection of monopole formation compressional sound waves is obtained.

SUMMARY OF THE INVENTION

This and other objects are attained in accordance with the concepts of the present invention through the provision of a sonic transducer that includes a plurality of elements distributed around the exterior of a collar that is part of a logging-while-drilling tool string. The elements have substantially equal angular spacing and are mounted at equal radial distances from the collar axis. Thus arranged, the amplitude of the M-th order multipole is $$\text{Multipole } M = \sum_{n=1}^{N} A_n \cos(M\theta_n) \quad \text{(Eq. 1)}$$

where $A_n$ is the amplitude factor of the n-th element, $\theta_n$ is the angular position around the collar circumference, and N is the total number of elements. For reference, the multipoles are M=1 (dipole), which is a function of Cos θ, through M=5 (decapole), which is a function of Cos 5θ, and so on. The monopole, (M=0) is independent of the angle θ.

In a preferred embodiment the amplitude factor A is the same for each transducer element, and thus is a constant, and the elements are distributed evenly around the collar. Then $$\theta_n = \frac{2n\pi}{N} \quad \text{(Eq. 2)}$$

and the M-th order multipole becomes:

$$\text{Multipole } M = A \sum_{n=1}^{N} \cos\left(\frac{2nM\pi}{N}\right) \quad \text{(Eq. 3)}$$

so that, except for the monopole, the M-th order multipole amplitude is zero (i.e. eliminated) if N is not equal to M. Thus the number of discrete transducer elements to be employed can be determined by the highest order of the multipoles to be eliminated.

In practice it is preferred to have the largest number of transducer elements that is possible. The transducer of this invention can be used as a transmitter that minimizes the excitation of multipole components (M>0) while enhancing the monopole (M=0) amplitude. The transducer also can be used as a receiver on a collar to minimize the sensitivity to the multipole waves traveling along the collar while maximizing the monopole formation component. In both cases the transducer includes a plurality of piezo-electric ceramic elements arranged in a ring.

The elements are connected in parallel, molded in a suitable elastomeric material such as rubber, installed in a shallow groove in the outer periphery of the collar, and covered by a steel shield for protection. The transducer assembly is rugged, small and modular for ease of maintenance.

In another aspect, the present invention includes the use of a ring transmitter as mentioned above, in combination with transverse receivers having stacks of piezo-electric elements as described in U.S. Pat. No. 5,387,767, which is incorporated herein by reference. Moreover, the present invention can be embodied in ring receivers in combination with a transverse, stacked piezo-electric element transmitter. In each case the ring transducer is mounted in a shallow external groove in the collar so as to be rugged and easily maintained.

BRIEF DESCRIPTION OF THE DRAWINGS

The present invention has the above as well as other objects, features and advantages which will become more clearly apparent in connection with the following detailed description of preferred embodiments, taken in conjunction with the appended drawings in which.

DETAILED DESCRIPTION OF PREFERRED EMBODIMENTS

Figure 1:
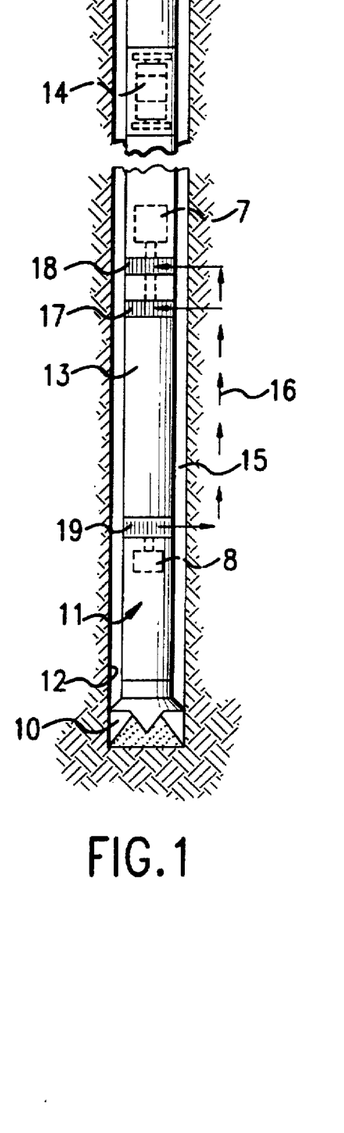
FIG. 1 is a schematic view of a logging-while-drilling operation using sonic transducers in accordance with the present invention.

Referring initially to FIG. 1, a drill bit 10 that is connected to the lower end of a string of drill collars 11 is shown drilling a borehole 12 into the earth. A specially made drill collar 13 near the bit 10 has one or more logging devices mounted on or in it, so that various characteristic properties of the layers of rock intersected by the borehole 12 can be measured as the borehole 12 is deepened. Electrical signals which are representative of such measurements are fed to a measuring-while-drilling tool 14 which includes a rotary valve or "siren" that generates pressure pulses in the mud stream inside the collar string 11 which are transmitted to the surface through the drill pipe. The rotary valve is controlled in response to the measurement signals and produces coded pressure pulses in the mud that are detected at the surface, decoded and displayed and/or recorded. The structural details of the mud pulse telemetering system are known and are disclosed, for example, in U.S. Pat. Nos. 4,100,528, 4,103,281, 4,167,000 and 5,237,540. Numerous measurements respecting formation characteristics can be made, such as resistivity or conductivity, natural gamma radiation, neutron, density and others, as well as various drilling parameter measurements, such as weight and torque on the bit, and borehole direction related measurements such as inclination and azimuth.

The invention disclosed and claimed herein is a sonic logging technique where travel time or velocity of acoustic waves through the rock adjacent the borehole 12 is measured, transmitted uphole, and recorded or logged versus depth as an indicator of porosity, while drilling. In a preferred arrangement, the technique is carried out using an acoustic wave transmitter 19 and two receivers 17 and 18 which are spaced at different axial distances from the transmitter. Acoustic energy in the form of sound waves emitted by the transmitter 19 propagates through the mud in the annulus 15 and into the formation outside the borehole 12 as shown schematically by the arrows 16 in FIG. 1. The sound waves arrive at the receivers 17, 18 at slightly different times.

The output of the receivers 17, 18 is analyzed electronically to determine sonic velocity on a continuing basis as the borehole 12 is extended through various rock formations. The use of two spaced-apart receivers 17, 18 allows compensation for acoustic waves that travel upward through the drilling mud in the annulus 15, and for variations in diameter, if any, of the borehole 12. One significant advantage of making sonic and other measurements while drilling is that invasion of the formation by mud, and formation of a mud cake on the borehole wall, will not yet have occurred at the level of the measuring instruments.

Figure 2:
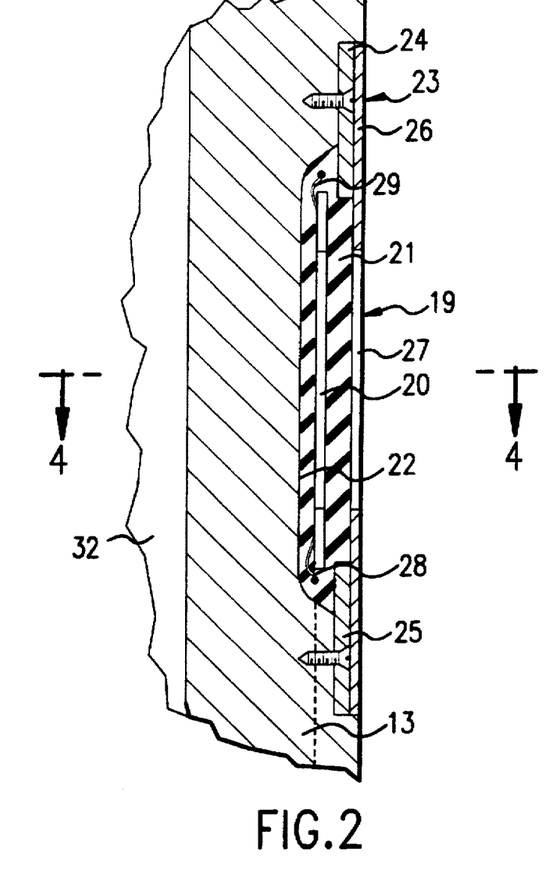
FIG. 2 is a longitudinal, fragmentary sectional view of a transmitter assembly according to the present invention mounted in an external collar groove.
Figure 3:
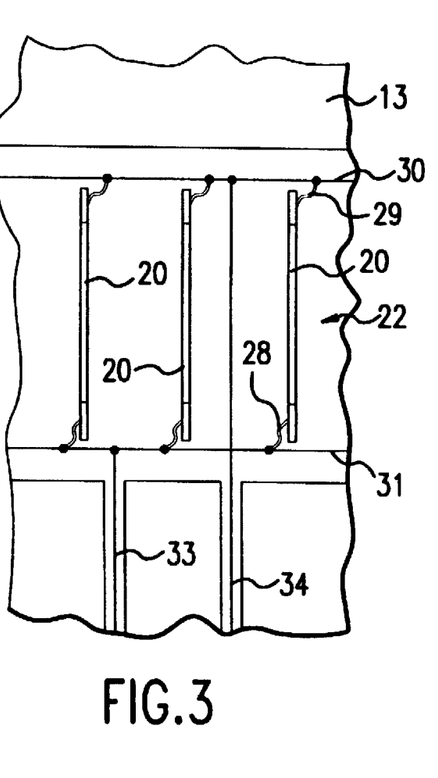
FIG. 3 is a fragmentary, developed plan view of the transmitter of FIG. 2 with the shield and elastomer ring removed.

FIG. 2 shows a transducer in accordance with the present invention in the form of a transmitter 19 that when excited produces acoustic wave energy. The transmitter 19 includes a plurality of elongated piezo-electric ceramic elements 20 that are mounted and molded within an annular elastomer body 21 which is seated in an external annular groove or recess 22 formed in the external walls of the drill collar 13. The elastomer body 21 is covered by a shield assembly 23 that includes upper and lower rings 24, 25 and a cylindrical sheath 26 having a window 27 formed radially outward of each element 20. A negative lead wire 28 extends downward from where it is connected to the lower end of each element 20, and a positive lead wire 29 extends upward from its connection to each element. As shown in developed plan view in FIG. 3, which has the shield assembly 23 and the elastomer body 21 removed for purposes of illustration, the elements 20 are circumferentially spaced around the groove 22 at substantially equal angular spacings, and at substantially equal radial distances from the central axis of the drill collar 13. The positive lead wires 29 are commonly connected to an annular positive collection wire 30, whereas the negative lead wires 28 are commonly connected to an annular negative collection wire 31. The wires 30, 31 are connected respectively to leads 34, 33 which extend through longitudinal grooves, as shown, and via a high pressure feed-through to a transmitter drive circuit shown generally at 8 in FIG. 1. When subjected to a drive signal in the form of an electrical pulse, the elements 20 each undergo a volumetric increase and jointly generate an acoustic wave front that travels out through the elastomer body 21, the windows 27, and the drilling mud in the annulus 15 outside the collar 13, and then propagates into the rock formations surrounding the borehole 12. Since a large number of the elements 20 is distributed around the circumference of the collar 13 in a circular array, they generate monopole acoustic waves, when excited.

Figure 4:
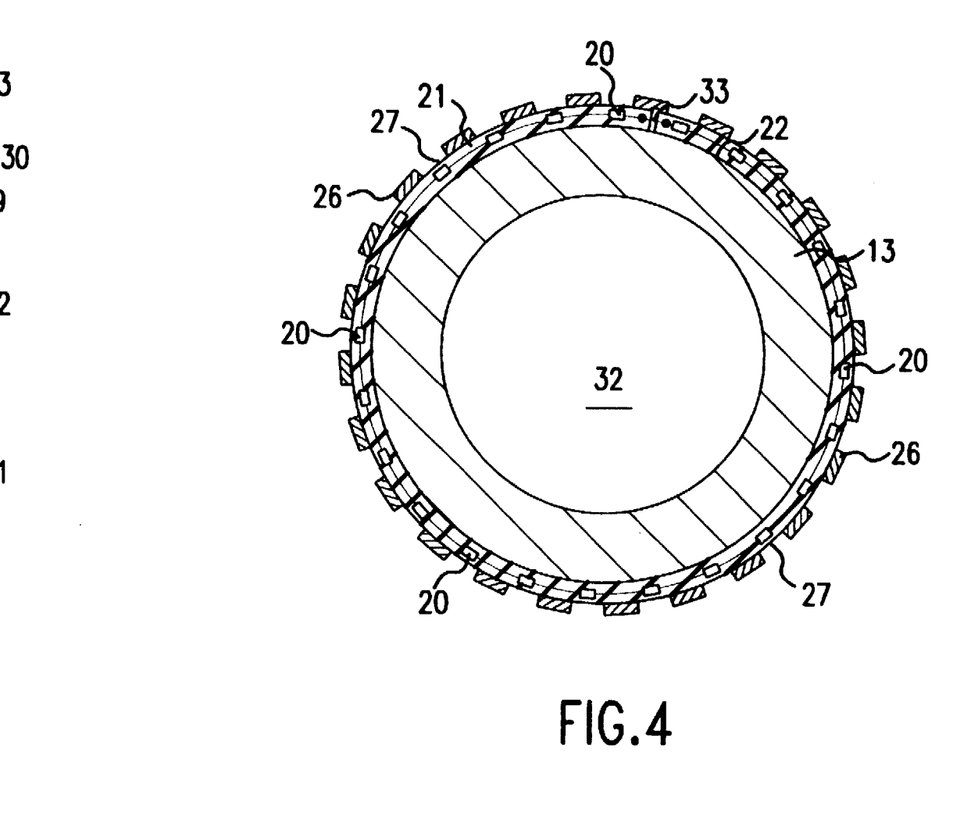
FIG. 4 is a cross-section view of the transmitter assembly mounted on the drill collar.

FIG. 4 shows a full cross-section through the drill collar 13 at the level of the sonic transmitter 19. The collar 13 has a central bore 32 through which drilling mud is pumped toward the bit 10 where it passes out through jets therein and returns to the surface via the annulus 15. In order to position or remove the elastomer body 21 in or from the groove 22, a radial split 33 can be formed therein. The windows or openings 27 in the sheath 26 are more clearly shown in FIG. 4, as is the equal angular and radial positioning of the piezo-electric ceramic elements 20 with respect to the central axis of the collar 13. Only twenty-four (24) of the elements 20 are shown for convenience of illustration, however it will be recognized that a different number can be used. It is preferred that as large a number as is possible for a given size collar 13 be used, because the monopole-to-multipole amplitude ratio is proportional to the number of the elements 20 if any of them should break or malfunction in use. In an exemplary embodiment, each of the elements 20 is 0.1 square inch in cross-section and 2 inches long, and is made of lead titanate or lead metaniobate, either of which has a high piezo-electric volume constant. In the frequency range below the length resonance, each element 20 expands in volume and thus is a point pressure source. The ceramics are matched in electroded area and piezo electric constant, which is best facilitated by cutting them from the same blank. The lead wires 28, 29, are connected via tabs in order to provide circumferential flexibility and ruggedness under temperature and pressure variations to ensure wire and connection integrity. In addition to mounting the elements 20 at the proper angular and radial positions, the elastomer body 21 protects the elements 20 from shock loads.

Another feature of the present invention is that the piezo-electric ceramic elements 20 of the transmitter 19 can be wired as multiple subarrays that each cover an angular sector. Each subarray can have its own drive circuit, or be driven by one circuit in a manner such that they are preferentially excited in a mode that produces monopole, crossed dipole, quadrupole or other higher order multipole sonic waves.

Figure 5:
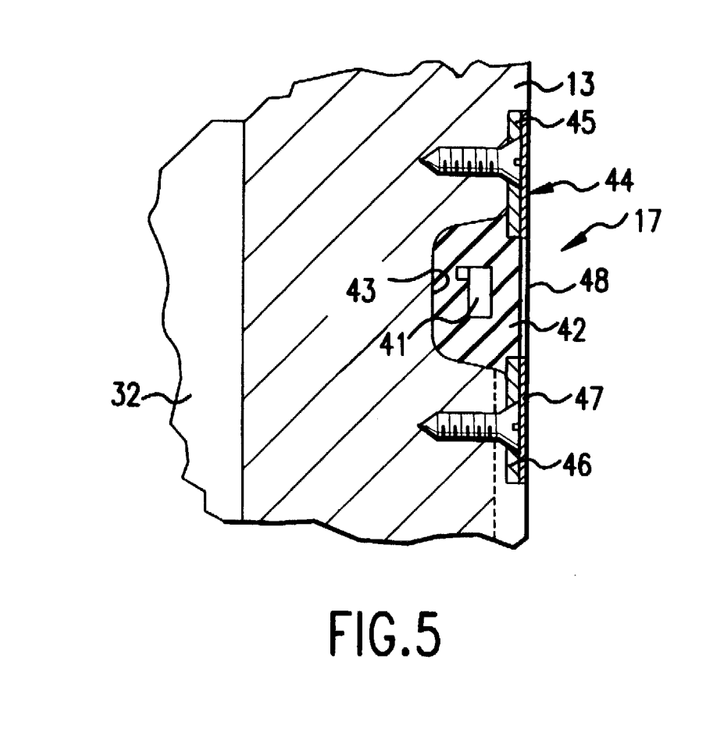
FIGS. 5 and 6 are views of a receiver assembly according to the present invention similar, respectively, to FIGS. 2 and 3.
Figure 6:
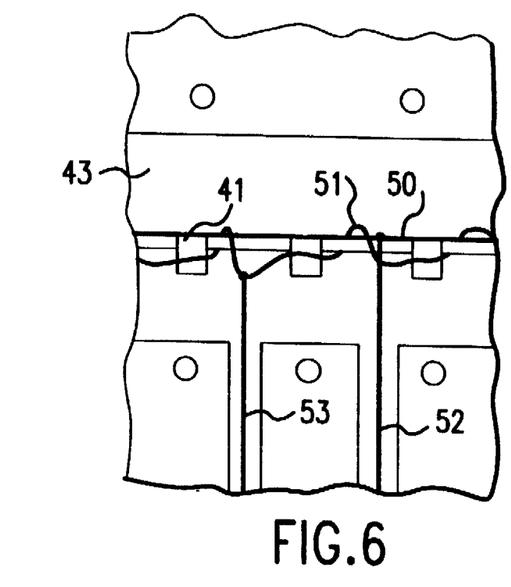
Figure 7:
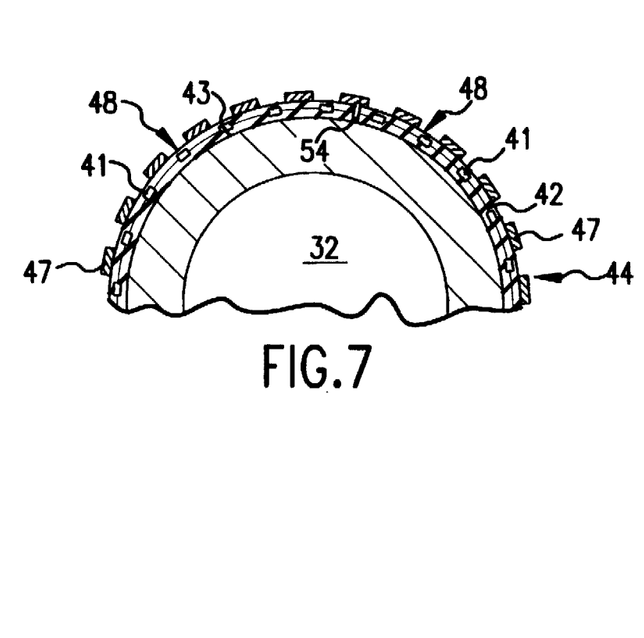
FIG. 7 is a half cross-sectional view of the receiver shown in FIGS. 5 and 6.

FIGS. 5–7 show a sonic transducer in accordance with the present invention in the form of a receiver 17 or 18 which senses incoming acoustic wave energy and produces current output indicative thereof. Each receiver 17 or 18 includes a plurality of circumferentially spaced piezo-electric ceramic elements 41 at substantially equal angular and radial spacings. The elements 41 are molded in an annular elastomer body 42 that fits in an external annular groove 43 in the collar 13. The annular array of elements 41 is protected by a shield assembly 44 including upper and lower rings 45, 46 and an outer sheath 47 that has a window 48 radially opposite each element 41. As in the previous embodiment, the rings 45, 46 and the shield 47 are held to the collar 13 by cap screws as shown. Positive and negative collection wires 50, 51 (FIG. 6) connect all the elements 41 in parallel, and lead wires 52, 53 extend via grooves and a high pressure feedthrough to the inputs of a receiver preamplifier 7 (FIG. 1). Hereagain, the elastomer body 42 is cut at 54 to allow installation and removal. In this example, each of the elements 41 is 0.25 square inch in cross-section by 0.1 inch thick, and in a typical sonic frequency range provides an omni-directional, point pressure receiver. The elements 41 also are matched in electroded area and piezo-electric strain constant, and preferably are cut from the same blank. The collection wires 50, 51 can be braided or looped as shown in order to give circumferential flexibility for mounting or removal. The outer portion of the elastomer body 42 conducts pressure waves from the formation via the mud in the annulus to the elements 41, and the elements transform the pressure waves into electric signals. These electric signals are added together by the parallel wiring arrangement as shown, and the independent sum is amplified by a charge preamplifier.

Figure 8A:
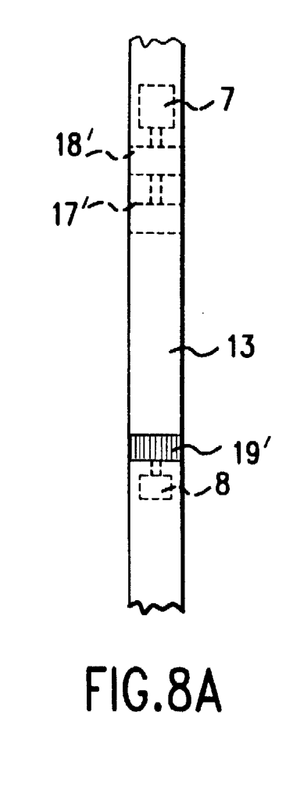
FIGS. 8A and 8B are schematic views of other embodiments of transmitter-receiver arrangements according to the invention.
Figure 8B:
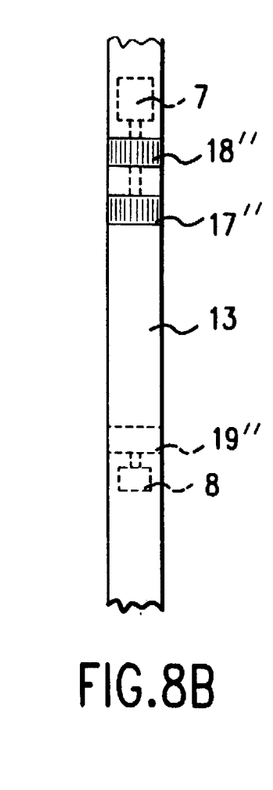

Other embodiments of the present invention are shown schematically in FIGS. 8A and 8B. For example the transmitter 19' in FIG. 8A can be a ring assembly of piezo-electric ceramic elements 20 as shown in FIG. 2 which are spaced around the groove 22 at substantially equal angular spacings, and at substantially equal radial distances from the longitudinal axes of the drill collar 13. The elements 20 are encased in an annular elastomer body 21 and protectively shielded as described above with respect to FIG. 2. The spaced receivers 17' and 18', which are positioned like receivers 17 and 18 in FIG. 1, are each a transverse assembly as disclosed in U.S. Pat. No. 5,387,767 mentioned above. Each of receivers 17' and 18' has stacks of piezo-electric ceramic elements that extend outward from a medial plate, and the stacks are mounted in a tubular housing that has opposite end portions that extend into diametrically opposed holes in the collar. The mounting produces bilateral symmetry and balanced mounting forces, and spring-mass damaging isolators are employed to attenuate transmission of acoustic waves to the drill collar 13. In another embodiment of the present invention as shown in FIG. 8B, the transmitter 19" having the location on the drill collar 13 of the ring transmitter 19 in. FIG. 1, is a transverse stacked element assembly as disclosed in U.S. Pat. No. 5,387,767, whereas the spaced receivers 17" and 18" are ring receivers as shown in FIGS. 5 and 6.

OPERATION

In operation and use of the present invention, the sonic transmitter 19 and the receivers 17 and 18 are mounted in the respective grooves 22 and 43 in the drill collar 13 which is connected in the drill string above the bit 10. The various electronic circuits to drive the transmitter 19 and to detect and process the signals from the receivers 17 and 18 typically are located in atmospheric chambers in the walls of the collar 13. The output of the system is fed in an appropriate manner to the measuring-while-drilling tool 14 which transmits encoded mud pulses to the surface so that a sonic log is recorded substantially in real time.

When the piezo-electric ceramic elements 20 of the transmitter 19 are subjected to an electrical pulse from the drive circuit 8, each element expands slightly in volume to create a pressure source which generates a pressure wave in the elastomer body 21. The pressure sources, due to volumetric expansion of each of the individual elements 20, are equal in amplitude and in phase. The sources thus reinforce each other and generate an output wave that is independent of azimuth, i.e. a monopole wave. Such wave travels through the drilling mud in the annulus 15 and propagates within the rock outside the borehole 12. Thus the wave travels longitudinally as shown by the arrows 16 in FIG. 1, and back inward through the mud to the receivers 17 and 18 where it energizes the elements 41 which produce electric current outputs. The phase or travel time difference between the received acoustic waves and the longitudinal spacings between the transmitter 19 and the respective receivers 17 and 18 are used to determine the velocity of sound through the rock. Such velocity is related to the porosity of the rock.

An acoustic wave also is coupled to the drill collar 13 when the transmitter 19 fires, and such wave travels directly to the receivers 17, 18. However, the monopole ring transmitter 19 of the present invention does not create multipoles so that the collar arrival has a smaller amplitude. The interfering energy of any formation quadrupole, hexapole and octupole is also suppressed.

Since the piezo-electric ceramic elements 20 are connected in parallel, and since the output is the independent sum and does not depend on the mechanical connection or structure of the ceramic elements, only a minor effect on total output occurs if a few of the elements are broken or their output somehow lost during drilling. Since the transmitter and receivers are modular units, they can easily be installed or removed, without affecting tool electronics, by securing or removing the shield and its cap screws.

The monopole ring receivers 17, 18 cancel or greatly suppress the multipole modes and thus are less responsive to collar arrivals. Noise signals propagating in the collar and in the borehole due to drilling will tend to travel in all the multipole modes. Therefore, the cancellation of higher order modes will lower the received drilling noise level.

Hereagain, it is noted that since the piezo-electric ceramic elements 41 are connected in parallel so that their output is the independent sum, and since such output does not depend on the mechanical connections or structure of the elements, loss or breakage of a few elements during drilling has only a minor effect on the total output.

It now will be recognized that a new and improved method and apparatus for sonic logging during drilling have been disclosed. Since certain changes and modifications may be made in the disclosed embodiments without departing from the inventive concepts involved, it is the aim of the appended claims to cover all such changes and modifications falling within the scope of the present invention.

We claim:

1. An acoustic transducer for mounting on a tubular drill string member for use in making sonic logging measurements of a subterranean earth formation surrounding a borehole while drilling through said subterranean earth formation, said sonic logging measurements including sonic velocity, earth formation porosity, seismic reflection/feature correlation, and reservoir potential evaluation, said transducer comprising: a plurality of transducer elements mounted external to said tubular drill string member and in an array around a surface on the circumference of said tubular drill string member, said transducer elements being located at substantially equal angular spacings and being arranged to excite and produce or detect acoustic waves that propagate through said subterranean earth formation.

2. The transducer of claim 1 wherein said transducer elements are piezo-electric elements.

3. The transducer of claim 1 wherein said transducer elements are located at substantially equal radial spacings from the center of said array.

4. The transducer of claim 1 wherein said excitement of said elements preferentially produces or detects monopole acoustic waves while suppressing multipole acoustic waves.

5. An acoustic transducer for mounting on a tubular drill string member for use in making sonic logging measurements in a borehole while drilling through a subterranean earth formation, said transducer comprising: a plurality of transducer elements mounted in an array around a surface on the circumference of said tubular drill string member, said transducer elements being located at substantially equal angular spacings and being arranged to excite and produce or detect acoustic waves that propagate through said earth formation, said transducer elements being mounted to an elastomer ring that is sized to fit in an external annular groove in said tubular drill string member.

6. The transducer of claim 5 further including surrounding means for shielding said elastomer ring and said transducer elements, said surrounding means having windows formed therein radially outward of each of said transducer elements.

7. The transducer of claim 6 wherein said elastomer ring is circumferentially discontinuous to enhance placement and removal thereof in and from said external annular groove.

8. The transducer of claim 1 further including electrical circuit means for connecting said transducer elements in parallel so that the output therefrom is the independent sum of the outputs from individual transducer elements.

9. The transducer of claim 1 further including electrical circuit means for connecting said transducer elements in parallel to detect averaged monopole acoustic waves around the circumference of said drill string member in order to minimize sensitivity to multipole acoustic waves and for applying output signals in response to detected monopole acoustic waves to an amplifier.

10. An acoustic transmitter for use in sonic logging in a subterranean earth formation during the drilling of a borehole into said subterranean earth formation, said sonic logging including measurements of sonic velocity, earth formation porosity, seismic reflection/feature correlation, and reservoir potential evaluation, said acoustic transmitter comprising: a tubular drill collar having a longitudinal axis and defining a circumferential surface; a circumferential transducer array having a plurality of individual transducer elements mounted external to said drill collar and in spaced relation around said circumferential surface of said drill collar; and electrical circuit means for connecting said plurality of individual transducer elements of said circumferential transducer array so that an electrical excitation applied thereto causes said transducer elements to generate a monopole acoustic wave that propagates into the subterranean earth formation surrounding the borehole.

11. The acoustic transmitter of claim 10 wherein said transducer elements are substantially immovably supported in said circumferential transducer array by an annular elastomer body, said annular elastomer body being cut through at one point in its circumference to facilitate placement and removal on and from said drill collar.

12. The acoustic transmitter of claim 11 further including shield means surrounding said circumferential transducer array and having individual windows formed radially outward of each of said transducer elements to allow passage of acoustic waves while protecting said annular elastomer body and said transducer elements in the borehole.

13. The acoustic transmitter of claim 10 further including driver means for exciting said transducer elements substantially uniformly around said circumferential transducer array to minimize generation of multipole acoustic waves in said drill collar while creating monopole acoustic waves that propagate outwardly into the subterranean earth formation surrounding the borehole.

14. A sonic well logging apparatus for use in determining the velocity of acoustic energy through a rock formation surrounding a borehole during the drilling thereof with a bit on the lower end of a drill string, comprising: a tubular collar adapted to be connected in the drill string above the bit, said collar having a first circumferential array of transducer elements mounted thereon, said first circumferential array being mounted in a first external annular groove in said collar, and second and third circumferential arrays of transducer elements being mounted in respective ones of a pair of second annular grooves in said collar, shield means surrounding respective ones of said annular grooves and having individual windows formed therein radially outward of each of said transducer elements; means for electrically exciting said first circumferential array to generate acoustic waves that propagate out into the rock formation; and means for detecting the arrival of said acoustic waves at each of said second and third circumferential arrays, whereby the detected waves can be used to compute the velocity of acoustic energy through the rock formation.

15. The well logging apparatus of claim 14 wherein each of said circumferential arrays is mounted in an annular elastomer body, each of said elastomer bodies being circumferentially discontinuous to facilitate removal and placement from and on said collar.

16. The well logging apparatus of claim 14 wherein exciting means includes circuit means for connecting each of said transducer elements of said first circumferential array in parallel to obtain substantially uniform excitation.

17. The well logging apparatus of claim 14 wherein said detecting means includes circuit means for connecting said transducer elements of each of said second and third circumferential arrays in parallel so that averaged acoustic waves around the circumference of each of said circumferential arrays are detected.

18. A sonic well logging apparatus for use in determining the velocity of acoustic energy through a rock formation surrounding a borehole during the drilling thereof with a bit on the lower end of a drill string, comprising: a tubular collar adapted to be connected in the drill string above the bit and defining a circumferential surface; a ring assembly of individual piezo-electric transmitting transducer elements mounted on said collar around said circumferential surface and adapted to generate acoustic waves that propagate outward into the formation; said individual piezo-electric transmitting transducer elements having substantially equal angular spacings and being located on substantially equal radii from the longitudinal axis of said collar; and at least one assembly of stacked receiving transducer elements mounted on said collar and longitudinally spaced from said ring assembly a selected distance for detecting the arrival of said acoustic waves to enable computation of the velocity of acoustic energy through the rock formation.

19. The apparatus of claim 18 wherein said stacked receiving transducer elements are stacked piezo-electric elements mounted in bilateral symmetry within a tubular housing having opposite end portions that are positioned in diametrically opposed holes in the walls of said collar.

20. A sonic well logging apparatus for use in determining the velocity of acoustic energy through a rock formation surrounding a borehole during the drilling thereof with a bit on the lower end of a drill string, comprising: a tubular collar adapted to be connected in the drill string above the bit; a transverse assembly of stacked transmitting transducer elements in said collar and adapted to generate acoustic waves that propagate outward into the rock formation; and at least one ring assembly of individual receiving transducer elements mounted in an external annular groove in said collar and having substantially equal annular spacings and being located on substantially equal radii from the longitudinal axis of said collar, said receiving transducer elements being longitudinally spaced from said transmitting transducer elements a selected distance for detecting the arrival of said acoustic waves from the rock formation to enable computation of the velocity of acoustic energy through the rock formation.

21. The apparatus of claim 20 wherein said transmitting transducer elements are piezo-electric elements mounted in bilateral symmetry within a tubular housing having opposite end portions that are positioned in diametrically opposed holes in the walls of said collar.

22. A method of generating and detecting acoustic waves in a borehole to obtain a log of the velocity of said waves through the rock formation surrounding the borehole while drilling, comprising of steps of: mounting first and second ring arrays of acoustic transducers in respective annular elastomer bodies, mounting said elastomer bodies in respective annular grooves in the exterior surface of a drill collar, using said first ring array of acoustic transducers to produce monopole acoustic waves that propagate out into the formation; using said second ring array of acoustic transducers to detect arrivals of said monopole acoustic waves from the rock formation.

23. The method of claim 22 including the further step of electronically connecting said acoustic transducers of said first ring array in parallel so that excitation of said acoustic transducers is substantially uniform around the circumference thereof.

24. The method of claim 22 including the further step of electrically connecting said acoustic transducers of said second ring array in parallel so that averaged acoustic waves are detected to minimize sensitivity to multipole acoustic waves.

25. The method of claim 22 including the further steps of shielding each of said elastomer bodies to protect the body and said acoustic transducers; and providing window openings in each of said shieldings radially outward of each of said acoustic transducers.

26. A method of performing acoustic logging of a rock formation surrounding a borehole while drilling by determining the velocity of acoustic waves through said rock formation, said method comprising the steps of: using first and second longitudinally spaced assemblies of transducer elements, one of said assemblies being a ring array of individual piezo-electric transducer elements mounted externally around the circumference of a collar within a drill string and above a drill bit, and the other of said assemblies being a stacked array of individual piezo-electric transducer elements mounted within the collar in bilateral symmetry; generating acoustic waves with one of said first and second longitudinally spaced assemblies of transducer elements that propagate outward into the formation; and detecting arrivals of such acoustic waves with the other of said assemblies to enable computation of the velocity of said acoustic waves through the rock formation.

27. A method of producing sonic wave energy for use in making acoustic measurements of earth formations surrounding a borehole, said acoustic measurements including logging measurements of sonic velocity, earth formation porosity, seismic reflection/feature correlation, and reservoir potential evaluation, said method comprising the steps of: providing a plurality of transducer elements mounted in a ring array around the circumference of a collar connected within a drill string; and preferentially exciting said transducer elements in a mode such that the polarity of the sonic waves produced is of a multipole order.

28. A sonic well logging apparatus for use in determining the velocity of acoustic energy through a rock formation surrounding a borehole during the drilling thereof with a bit on the lower end of a drill string, comprising: a tubular collar defining a circumferential surface, and adapted to be connected in the drill string above the bit, said collar having a first circumferential array of transducer elements mounted around said circumferential surface, and second and third circumferential arrays of transducer elements mounted around said circumferential surface, said first, second and third circumferential arrays being disposed in axially spaced relation with one another; means for electrically exciting said first circumferential array around said circumference to generate acoustic waves that propagate out into the rock formation; and means for detecting the arrival of said acoustic waves at each of said second and third circumferential arrays of transducer elements, whereby the detected acoustic waves can be used to compute the velocity of acoustic energy through the rock formation.

* * * * *